(12) United States Patent
Van Der Hoorn et al.

(10) Patent No.: US 12,405,784 B2
(45) Date of Patent: Sep. 2, 2025

(54) SOFTWARE DEVELOPMENT ENVIRONMENT PREBUILD TRIGGERED BY ENVIRONMENT CHANGE COMMITS

(71) Applicant: Microsoft Technology Licensing, LLC, Redmond, WA (US)

(72) Inventors: Anthony Van Der Hoorn, Portland, OR (US); Srivatsn Narayanan, Bothell, WA (US); Anuradha Sharma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 17/735,829

(22) Filed: May 3, 2022

(65) Prior Publication Data
US 2023/0359457 A1    Nov. 9, 2023

(51) Int. Cl.
   *G06F 8/71* (2018.01)
   *G06F 8/36* (2018.01)
   *G06F 9/455* (2018.01)

(52) U.S. Cl.
   CPC .................. *G06F 8/71* (2013.01); *G06F 8/36* (2013.01); *G06F 9/45558* (2013.01); *G06F 2009/45562* (2013.01)

(58) Field of Classification Search
   CPC ..... G06F 8/71; G06F 8/60; G06F 8/33; G06F 8/36; G06F 9/45558; G06F 2009/45562
   See application file for complete search history.

(56) References Cited

U.S. PATENT DOCUMENTS

| | | | |
|---|---|---|---|
| 11,907,699 B2 * | 2/2024 | Chen | G06F 8/71 |
| 2013/0297579 A1 * | 11/2013 | Andrew | G06F 8/71 707/698 |
| 2021/0382709 A1 * | 12/2021 | Sagal | G06F 8/71 |
| 2022/0197621 A1 * | 6/2022 | Plewa | G06F 8/71 |

* cited by examiner

*Primary Examiner* — S. Sough
*Assistant Examiner* — Cheneca Smith
(74) *Attorney, Agent, or Firm* — Workman Nydegger (57) ABSTRACT

A computer system is configured to identify a software development environment (SDE), and generate a first prebuild of the SDE. The computer system is further configured to obtain data associated with a plurality of elements that are related to a state of the SDE, and generate a first hash based on data associated with the plurality of elements. The computer system is also configured to identify a commit to the SDE and determine that the commit changed the state of SDE by obtaining data associated with the plurality of elements, generating a second hash based on the data, and determining that the second hash is different from the first hash. In response to determining that the first commit changed the state of the SDE, the computer system then generates a second prebuild of the SDE.

20 Claims, 7 Drawing Sheets

SOFTWARE DEVELOPMENT ENVIRONMENT PREBUILD TRIGGERED BY ENVIRONMENT CHANGE COMMITS

BACKGROUND

Typically, when a software development environment is prepared for a specific organization or repository, it requires a great deal of time to be taken up by downloading and starting the appropriate container images, such as docker images, downloading the required source code, fetching the external dependencies, executing custom scripts, setting up permissions, etc.

For example, when a software developer requests a new development environment to be created, an automated system may download all the packages and tools needed to create and configure the development environment, which can take several minutes or even hours depending on the size and number of packages.

Further, when multiple software developers are simultaneously working on a project, a first software developer is working in a first environment, and a second software developer is working in a second environment. The first software developer may trigger some commits to the first environment, and the second software developer may trigger some other commits to the second environment. After a while, the first environment and the second environment are no longer the same, and in some cases, the first environment and the second environment may not be compatible with each other. When incompatibility occurs, it often takes a great deal of time to make the two environments to be compatible again.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computer system configured to generate prebuilds based on state-changing commits of software development environments (SDEs). In particular, the computer system is configured to identify an SDE, and generate a prebuild of the SDE (also referred to as a 'first prebuild"). The computer system is also configured to obtain data associated with a plurality of elements that are related to a state of the SDE. In some embodiments, the plurality of elements include a manifest file that defines the SDE, or another file specified in the manifest file. In some embodiments, the SDE is hosted in a container, and the plurality of elements include a container image file, and/or a container definition.

The computer system is also configured to generate a hash based on the data associated with the plurality of elements of the SDE (also referred to as a 'first hash"). The computer system is also configured to identify a commit to the SDE (also referred to as a "first commit") and determine that the commit changed the state of the SDE. Determining that the first commit changed the state of the environment includes obtaining data associated with the plurality of elements again, generating a second hash based on the plurality of elements, and determining that the second hash is different from the first hash. In response to determining that the first commit changed the state of the SDE, the computer system generates a second prebuild of the SDE.

In some embodiments, the computer system is further configured to back up a plurality of historical prebuilds of the SDE and a plurality of historical hashes generated based on the plurality of historical prebuilds of the SDE in a storage. The computer system is further configured to compare the second hash with each of the plurality of historical hashes to determine whether the second hash is different from each of the plurality of historical hashes. In response to determining that the second hash is different from each of the plurality of historical hashes, the computer system backs up the second prebuild of the SDE and the second hash in the storage.

The principles described herein are also related to a method for triggering SDE prebuild by environment change commits of SDEs. The method includes identifying an SDE, and generating a first prebuild of the SDE. The method further includes obtaining data associated with a plurality of elements that are related to a state of the SDE, and generating a first hash based on the data associated with the plurality of elements. The method further includes identifying a first commit to the SDE and determining that the first commit changed the state of the SDE. Determining that the first commit changed the state of the SDE includes obtaining data associated with the plurality of elements again, generating a second hash based on the data associated with the plurality of elements, and determining that the second hash is different from the first hash. In response to determining that the first commit changed the state of the SDE, a second prebuild of the SDE is generated.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Typically, when a software development environment (SDE, also referred to as an "environment") is prepared for a specific organization or repository, it requires a great deal of time to be taken up by downloading and staring the appropriate container image (e.g., docker image), downloading the required source code, fetching the external dependencies, executing custom scripts, setting up permissions, etc. To optimize the time that the user is required to wait for all this to occur, the principles described herein include, ahead of time, generating an artifact (also referred to as a "prebuild") that represents a point in time snapshot of the complete SDE, including (but not limited to) the users workspace directory. Once this prebuild is created, it can be used to quickly restore the point in time of the SDE. Alternatively, or in addition, a prebuild can be assigned to an individual user as if it was something that was created from scratch. Post the user being assigned, the prebuild also supports executing any scripts/setup that can only happen once the user is known.

In some embodiments, the SDE is containerized and provided by a cloud service, such that users can set up their SDE nearly instantly based on prebuilds. In some embodiments, the prebuilds are storage-backed prebuilds. The storage-backed prebuilds are prebuilds that are pre-stored in a storage, and in response to a user's request, a VM or container is provisioned to the user, and one of these storage-backed prebuilds is assigned to the VM. In some embodiments, the prebuilds are compute-backed prebuilds to further speed up the setup process. A compute-backed prebuild is a VM or a container with the prebuild installed. The VM or the container is up and running. In response to a user's request, the VM or the container is allocated to the user, and the prebuild can simply be started in the VM.

Further, since a prebuild is unique to a given point in time, no new prebuild is needed if the environment hasn't changed in such a manner that the old prebuild is still compatible. However, it is a challenge to determine whether the state of the environment has changed in such a manner that the old prebuild is no longer compatible because an SDE depends on the organization and repository, and hundreds of updates might be made per day. Without a proper determination of whether the environment has changed, a new prebuild would be generated for every single commit, which could be very costly or even impractical.

To solve this problem, the principles described herein include generating a hash based on a plurality of elements that are associated with the state of the SDE. The plurality of elements can include contents of one or more artifacts in the repository itself. Some of the one or more artifacts are predetermined as being significant in determining the state of the environment. It is also possible that a given repository might have additional files that need to be taken into account when considering if an environment mutation has occurred. In some embodiments, users can specify additional files that will be needed to be taken into account for computing hashes. As such, if the content of any one of these artifacts were to change, the state of the environment is considered to have changed, and hence a new prebuild will be produced.

The hash can then be used as, or to derive, a unique fingerprint of an SDE for any given commit. Once the hash is generated, it can then be compared with a previous hash corresponding to a previous prebuild to determine whether the new commit is compatible with a previous prebuild. If the new hash and the previous hash are the same, it is likely that the new commit is compatible with the previous prebuild; thus, no new prebuild is needed. Otherwise, a new prebuild should be generated.

Figure 1:
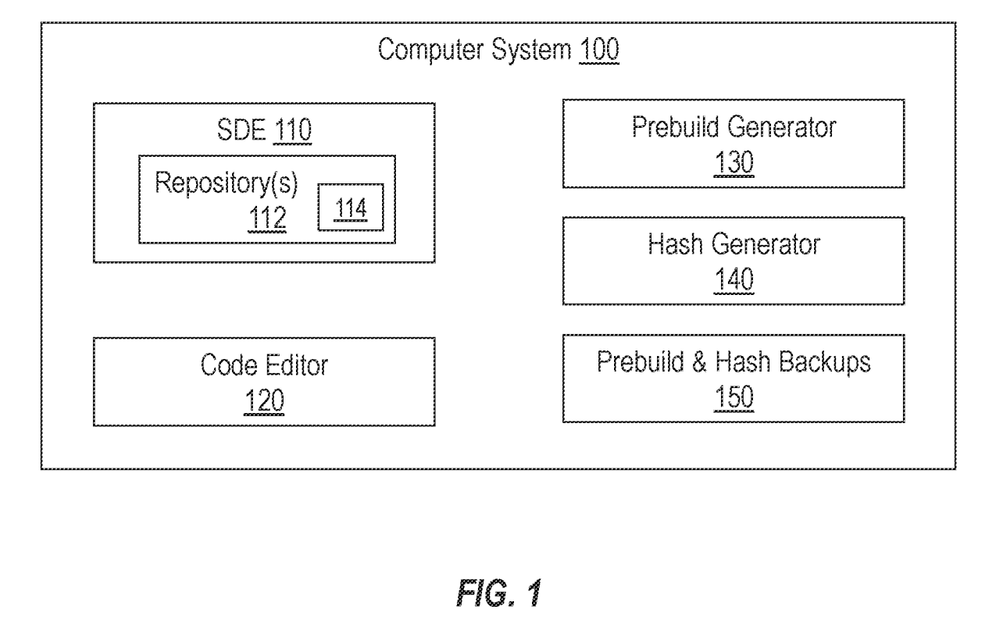
FIG. 1 illustrates an example architecture of a computer system in which the principles described herein may be implemented.

FIG. 1 illustrates an example architecture of a computer system 100 that implements the principles described herein. The computer system 100 includes a software development environment (SDE) 110 having access to one or more repositories 112. In some embodiments, at least one of the one or more repositories 112 are stored locally. In some embodiments, at least one of the one or more repositories 112 are stored remotely and accessible over a network. In some embodiments, the computer system 100 also has a code editor 120 configured to allow a user to edit the code stored in the repositories 112.

Further, the computer system 100 also includes a prebuild generator 130 configured to generate prebuilds. Each prebuild represents a point-in-time snapshot of the complete SDE, including (but not limited to) the user's workspace directory. The computer system 100 also includes a hash generator configured to collect data associated with a plurality of elements associated with the state of the SDE, and use the data associated with the plurality of elements as inputs to generate a hash. The prebuild and the hash can then be backed up in a storage 150, which may be a local storage or a cloud storage.

In some embodiments, the hash generator 140 is configured to generate a new hash when a new commit is detected. The generated hash is compared with a previous hash stored in the storage 150 to determine whether the commit has triggered a new environment that is incompatible with the previously backed-up environment. In response to determining that the new hash is different from each of the backed-up hashes stored in the storage 150, the computer system 100 determines that a new prebuild is to be generated.

The plurality of elements that are used to generate hash can include contents of one or more artifacts 114 in the repository itself. Some of the one or more artifacts 114 are predetermined as being significant in determining the environment state. In some embodiments, a given repository has additional files that need to be taken into account when considering if an environment mutation has occurred. In some embodiments, users are allowed to specify additional files that will be needed to be taken into account for computing hashes. As such, if the content of any one of these artifacts 114 were to change, the state of the environment is considered to have changed, and a new prebuild will be produced.

In some embodiments, the plurality of elements and/or the one or more artifacts in the repository include certain files, such as a manifest file that defines the SDE, or another file specified in the manifest file. In some embodiments, the SDE is hosted in a container, and the plurality of elements include a container image file. In some embodiments, the plurality of elements include a container definition file.

Figure 2:
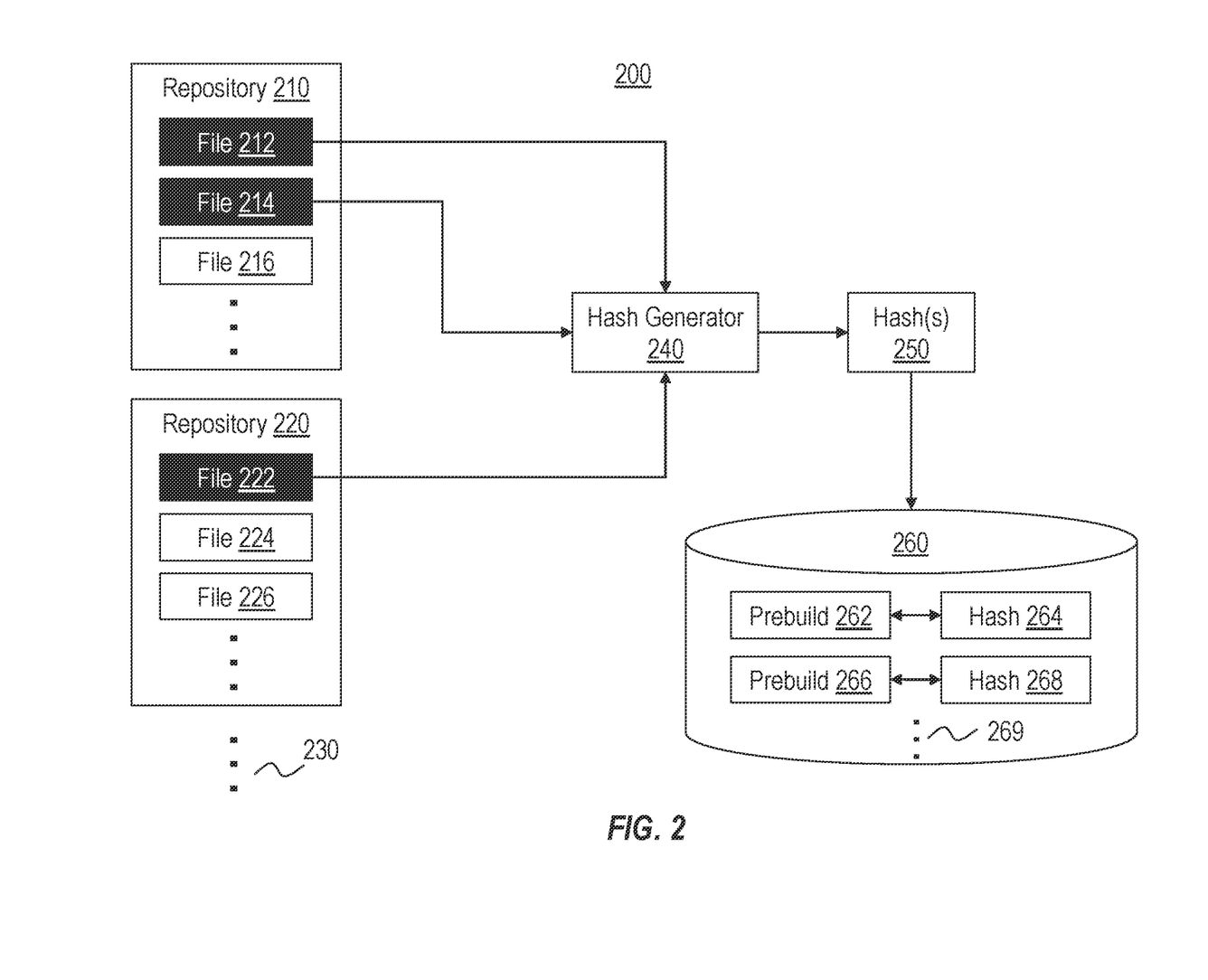
FIG. 2 illustrates an example process of generating hashes based on data associated with one or more files in one or more repositories.

FIG. 2 illustrates an example process 200 of generating a new hash 250. As illustrated in FIG. 2, the SDE may include a plurality of repositories 210 and 220. The ellipsis 230 represents that there may be any number of repositories in the SDE. Each of the repositories 210, 220 may be local or remote. In each of the repositories, one or more files are identified as significant in determining the environment state. For example, in repository 210, files 212, 214 are determined as significant; and in repository 220, file 222 is determined as significant. As such, files 212, 214, 222 are the plurality of elements to be input into a hash generator 240 (corresponding to the hash generator 140 of FIG. 1) to generate a hash 250.

A hash is an output of a hashing algorithm, such as (but not limited to) MD5 (Message Digest 5) or SHA (Secure Hash Algorithm). A hash algorithm is configured to produce a unique, fixed-length string—also referred to as a hash or hash value—for any given piece of data. Since every file is just data that can be represented in binary form, a hashing algorithm can take one or more files and run a complex calculation on it and output a fixed-length string as the result of the calculation. The result is the file's hash. In some embodiments, each file 212, 214, 222 is separately hashed to generate a separate hash for each file. The separate hashes can then be hashed or combined to generate a single value. In some embodiments, the files 212, 214, 222 are combined together as inputs to the hash generator 240 to generate a single hash.

Because the hash algorithm is configured to produce a unique hash for any given piece of data, different pieces of data would result in different hashes. If any one of the files 212, 214, 222 changes in anyway, the hash generator 240 will generate a different hash. For the same reasons, if none of the files 212, 214, 222 change at all, the hash generator 240 will generate a same hash based on the same data.

The generated hash 250 is then compared with historical hashes to determine whether a new SDE has been created that is incompatible with any historical SDEs. As illustrated, storage 260 (corresponding to the storage 150 of FIG. 1) is configured to back up a plurality of historical prebuilds 262, 266 and their corresponding hashes 264, 268. The ellipsis 269 represents that there may be any number of prebuild-hash pairs backed up in the storage 260. In some embodiments, the newly generated hash 250 is compared with each of hashes 264, 268 that are backed up in a storage 260. If the new hash 250 is different from each of the hashes 264, 268, it is determined that a new SDE has been created that is likely incompatible with any historical SDEs that have been backed up in the storage. As such, a new prebuild should be generated to back up the newly created SDE. The hash 250 is also backed up with the corresponding prebuild.

In some embodiments, a predetermined number (e.g., 5 or 10) of prebuild-hash pairs are backed up in the storage 260. In some embodiments, each prebuild-hash pair is being backed up for a predetermined period (e.g., 6 months, a year). In some embodiments, users can set their own prebuild-hash retention policy. For example, a user can set to back up every prebuild-hash infinitely, or set an upper limit of the storage that can be used to back up the prebuilds.

If the new hash 250 is different from any one of the hashes 264, 268 backed up in the storage 260, a new prebuild is generated, and the new prebuild and the corresponding hash 250 are backed up in the storage 260. If the retention policy allows a predetermined number of prebuilds to be stored in the storage 260, the oldest prebuild and its corresponding hash may be purged in response to storing the new hash 250 and its corresponding prebuild.

In some embodiments, many users may be simultaneously working on a same project, and each of the users may have their own copy of a repository (also referred to as a fork). When a first user's fork is modified in a manner that is incompatible with any other user's historical fork, a new prebuild is generated based on the first user's fork, and the new prebuild is backed up in a storage, such as a cloud storage. Thereafter, when a second user's fork is modified in a manner that is incompatible with the first user's fork or any other user's historical fork, a second new prebuild is backed up. Eventually, the central repository may be updated based on one of the user's fork, causing another user's fork to be incompatible with the central repository. When such a case happens, the other user can simply obtain a prebuild that is compatible with the central repository, and restart the SDE based on that prebuild.

Figure 3:
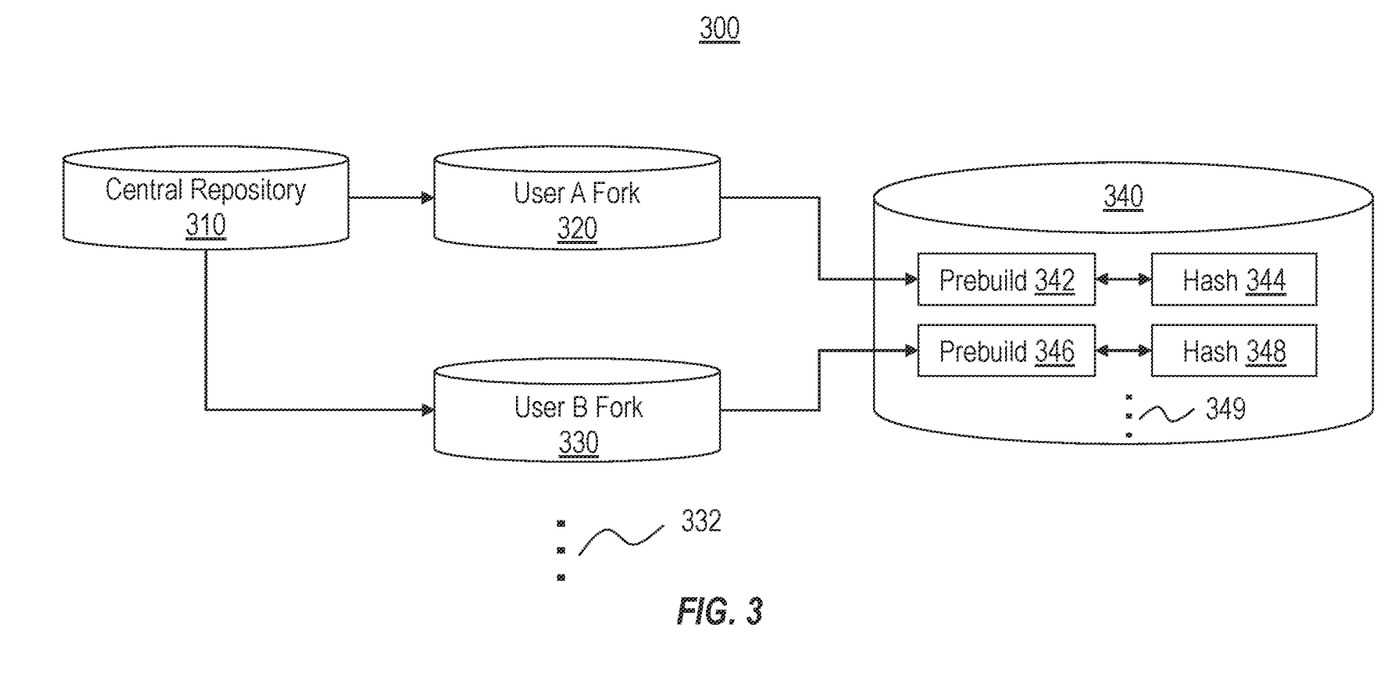
FIG. 3 illustrates an example environment in which there are a central repository and multiple forks that have been worked on by different users.

FIG. 3 illustrates an example environment 300, in which there is a central repository 310, a user A fork 320, and a user B fork 330. The user A fork 320 is a copy of the central repository 310 that has been worked on by user A. The user B fork 330 is a copy of the central repository 310 that has been worked on by user B. The ellipsis 332 represents that there may be any number of forks that are being worked on by different users in environment 300. After a while, the user A fork 320 and the user B fork 330 may no longer be compatible with the central repository 310, depending on the commits being made at the forks and the commits accepted by the central repository 310.

As illustrated, when a change is committed to user A fork 320, a prebuild 324 and a corresponding hash 344 are generated and backed up in a storage 340 (corresponding to the storage 260 of FIGS. 2 and/or 150 of FIG. 1). When a change is committed to user B fork 330, a prebuild 346, and a corresponding hash 348 are generated and backed up in a storage 340. The ellipsis 349 represents that there may be any number of prebuild-hash pairs backed up in the storage 340.

Notably, the fact that two prebuilds 342, 346 are generated indicates that the environment of user A fork 320 and the environment user B fork 330 are incompatible with each other at this moment. If the central repository 310 determines to accept one of the commits to user A fork 320 or to user B fork 330's, the other user fork needs to be modified to be compatible with the central repository 310. In such a case, that user fork simply needs to acquire the prebuild generated by the other user fork, and restart its SDE with that prebuild. For example, assuming that the central repository 310 has accepted the commits to user A fork 320, the environment of the user B fork will no longer be compatible with the environment of the central repository. In such a case, user B can simply retrieve the prebuild 342 generated by the environment of the user A fork, and restart their own environment based on the prebuild 342, which should now be compatible with the environment of the central repository 310.

In some embodiments, the SDE is containerized and provided by a cloud service, such that users can set up their SDE nearly instantly based on prebuilds. In some embodiments, the prebuilds are storage-backed prebuilds. The storage-backed prebuilds are the prebuilds that are pre-stored in a storage, and in response to a user's request, a VM or container is provisioned for the user, and one of these storages that stores a prebuild is allocated to the VM. As such, once the VM is up and running, the user can start an SDE based on the prebuild.

In some embodiments, the prebuilds are compute-backed prebuilds to further speed up the setup process. A compute-backed prebuild is a VM or a container with the prebuild pre-stored. The VM or the container is set up and kept running before any user requests. In response to a user's request, the VM or the container is allocated to the user, and the user can simply use the prebuild to start the SDE in the VM.

Figure 4:
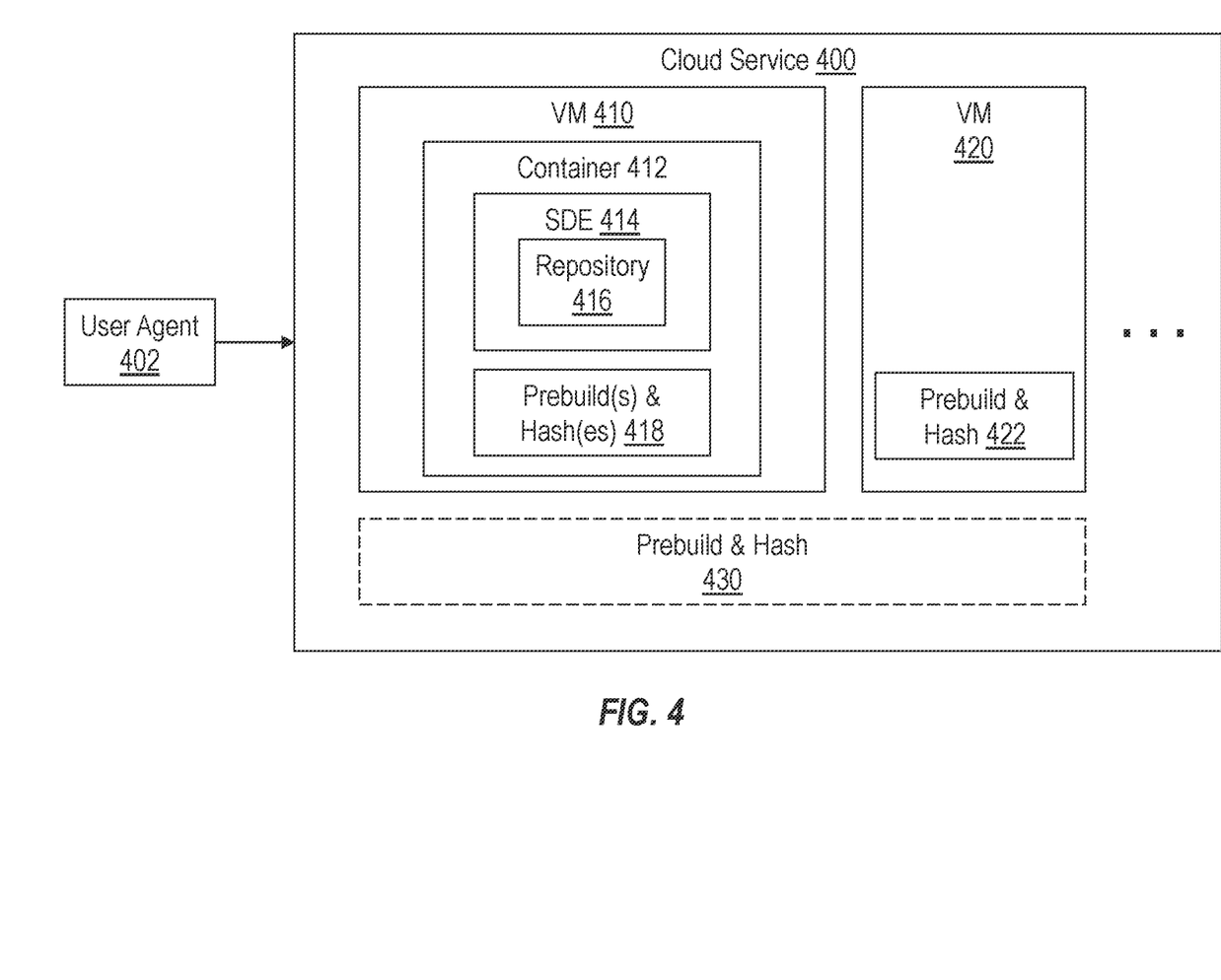
FIG. 4 illustrates an example cloud service configured to provide software development environments (SDEs) in a cloud service, wherein the SDEs may be provided via storage-backed prebuild and/or compute-backed prebuild.

FIG. 4 illustrates an example cloud service 400 configured to provide SDE services to users. A user can remotely access the cloud service 400 via a user agent 402 installed on any computer system. In some embodiments, the user agent 402 is a browser. In some embodiments, SDE 414 (having access to one or more repositories 416) is hosted in a container 412, which is hosted in a virtual machine 410, which is hosted at the cloud service 400.

In some embodiments, the cloud service 400 provides storage-backed prebuilds 430 or compute-backed prebuilds 422 to users. The storage-backed prebuilds 430 are prebuilds pre-stored in a cloud storage that is ready to be allocated to a VM in response to receiving a user request. The storage-backed prebuilds saves the setup time required for copying various repositories and files into an SDE. However, the provision of other hardware required by the VM will still take some time. The compute-backed prebuilds 422 will further reduce the setup time, because the compute-backed prebuilds 422 sets up a VM completely and keeps the VM running. A storage allocated to the VM is configured to store the prebuild 422. In response to receiving a user request, the VM 420 is assigned to the user, and the user can simply start the SDE using the prebuild 422 stored thereon.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5A:
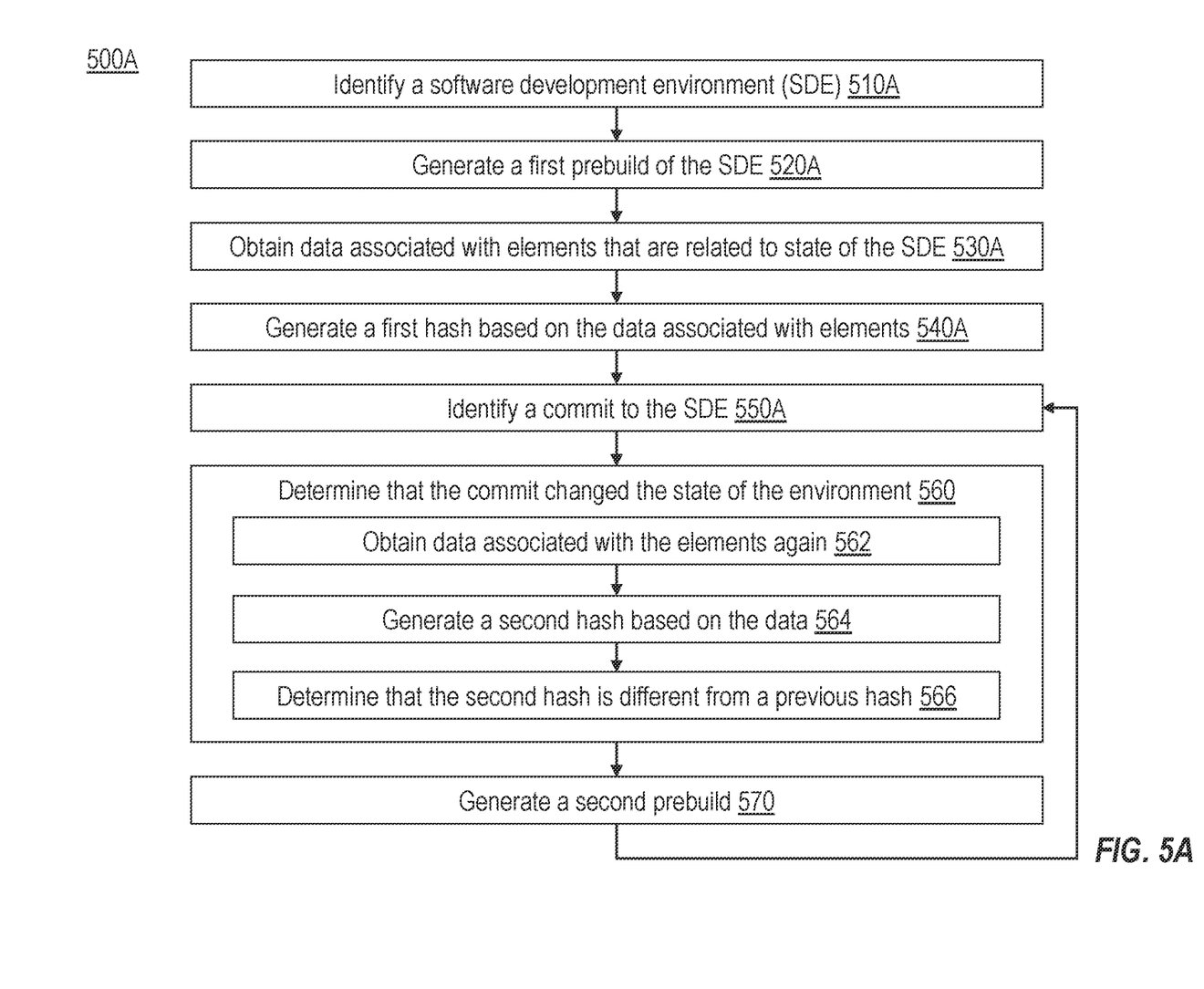
FIG. 5A illustrates a flowchart of an example method for generating prebuilds of an SDE based on environment changing commits.

FIG. 5A illustrates a flowchart of an example method 500A for generating prebuilds of a SDE based on environment change commits. The method 500A includes identifying an SDE (act 510A), and generating a first prebuild of the SDE (act 520A). The method 500A also includes obtaining data associated with a plurality of elements that are related to a state of the SDE (act 530A) and generating a first hash based on the data associated with the plurality of elements (act 540A).

The plurality of elements can include the contents of one or more artifacts in a repository of the SDE. Some of the one or more artifacts are predetermined as being significant in determining the state of the environment. It is also possible that a given repository might have additional files that need to be taken into account when considering if an environment mutation has occurred. In some embodiments, users can specify additional files that will be needed to be taken into account for computing hashes.

The method 500A further includes identifying a commit to the SDE (act 550A) and determining that the commit changed the state of the environment (act 560A). Determining that the commitment changed the state of the environment (act 560A) includes obtaining data associated with the plurality of elements again (act 562A), generating a second hash based on the data associated with the plurality of elements (act 564A), and determining that the second hash is different from a previous hash (e.g., the first hash) (act 566A). In response to determining that the commit changed the state of the environment, a second prebuild is generated (act 570A).

A hash is an output of a hashing algorithm, such as (but not limited to) MD5 (Message Digest 5) or SHA (Secure Hash Algorithm). A hash algorithm is configured to produce a unique, fixed-length string—also referred to as a hash or hash value—for any given piece of data. Since every file is just data that can be represented in binary form, a hashing algorithm can take one or more files and run a complex calculation on it and output a fixed-length string as the result of the calculation. As such, if the content of any one of these artifacts were to change, the state of the environment is considered to have changed, and hence a new prebuild will be produced.

The act 550A, 560A, and 570A may repeat as many times as necessary. For example, whenever a new commit is identified (act 550A), it is determined whether the commit is likely to change the state of the environment (act 560A). In response to determining that the commit is likely to change the state of the environment (act 560A), a new prebuild is generated (act 570A).

In some embodiments, more than one prebuild has been previously generated. These previously generated prebuilds are also referred to as historical prebuilds. The act 560 may be replaced with determining that the commit did not create a new state of the SDE. Determining that the commit did not create a new state of SDE includes determining that the second hash is different from each of the historical hashes corresponding to the historical prebuilds. In response to determining that the second hash is different from each of the historical hashes, the second prebuild is generated (act 570). In some embodiments, a predetermined number (e.g., 5 or 10) of prebuild-hash pairs are backed up in a storage. In some embodiments, each prebuild-hash pair is being backed up for a predetermined period (e.g., 6 months, a year). In some embodiments, users can set their own prebuild-hash retention policy. For example, a user can set to back up every prebuild-hash infinitely, or set an upper limit of the storage that can be used to back up the prebuilds.

Figure 5B:
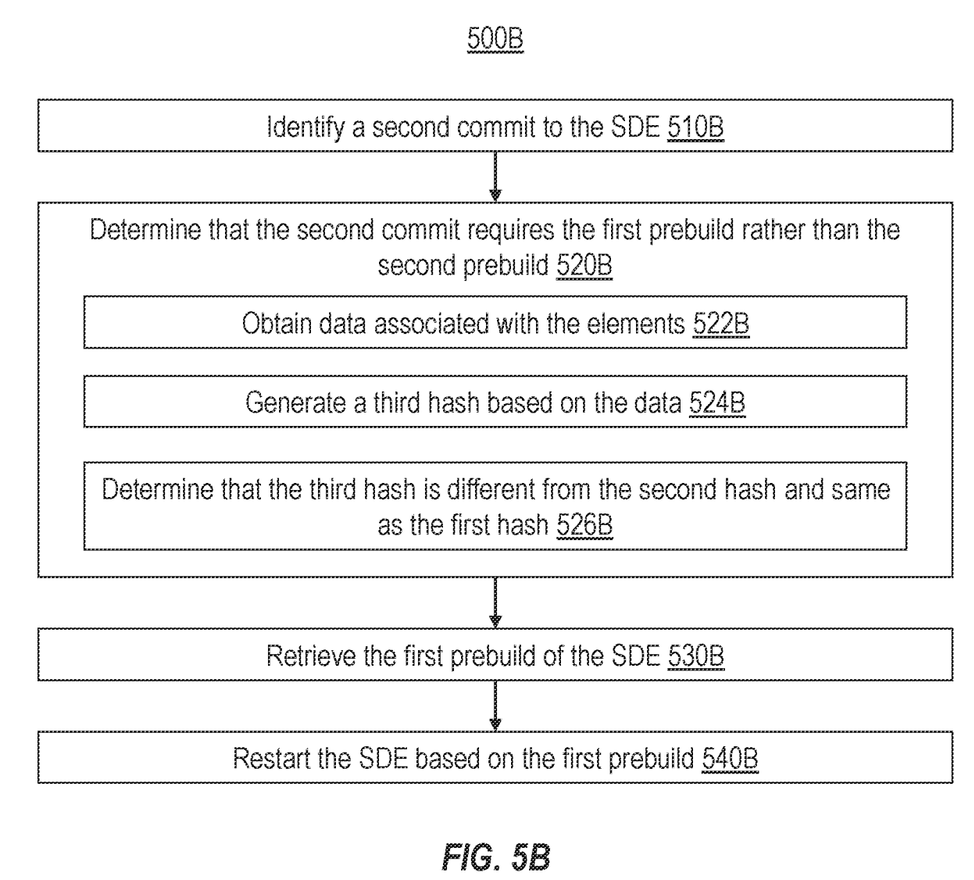
FIG. 5B illustrates a flowchart of an example method for reverting to a previous prebuild based on certain commits.

FIG. 5B illustrates a flowchart of an example method 500B for reverting back to a previous prebuild. The acts in method 500B follow the acts in method 500A. Method 500B includes identifying a second commit to the SED (act 510B) and determining that the second commit requires the first prebuild rather than the second prebuild (act 520B). This scenario may be caused by different forks of a single project that are simultaneously worked on by different users, and the different commits at different forks may not be compatible with each other.

Determining that the second commit requires the first prebuild rather than the second prebuild (act 520B) includes obtaining data associated with the plurality of elements that are related to the state of the SDE (act 522B), generating a third hash based on the data associated with the plurality of elements (act 524B), and determining that the third hash is different from the second hash and same as the first hash (act 526B). In response to determining that the second commit requires the first prebuild rather than the second prebuild (act 520B), the first prebuild of the SDE is retrieved (act 530B) and the SDE is restarted based on the first prebuild (act 540B).

Finally, because the principles described herein may be performed in the context of a computer system (for example, the computer system 100, and the cloud service 400 are all computer systems), some introductory discussion of a computer system will be described with respect to FIG. 6.

Computer systems are now increasingly taking a wide variety of forms. Computer systems may, for example, be hand-held devices, appliances, laptop computers, desktop computers, mainframes, distributed computer systems, data centers, or even devices that have not conventionally been considered a computer system, such as wearables (e.g., glasses). In this description and in the claims, the term "computer system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computer system. A computer system may be distributed over a network environment and may include multiple constituent computer systems.

Figure 6:
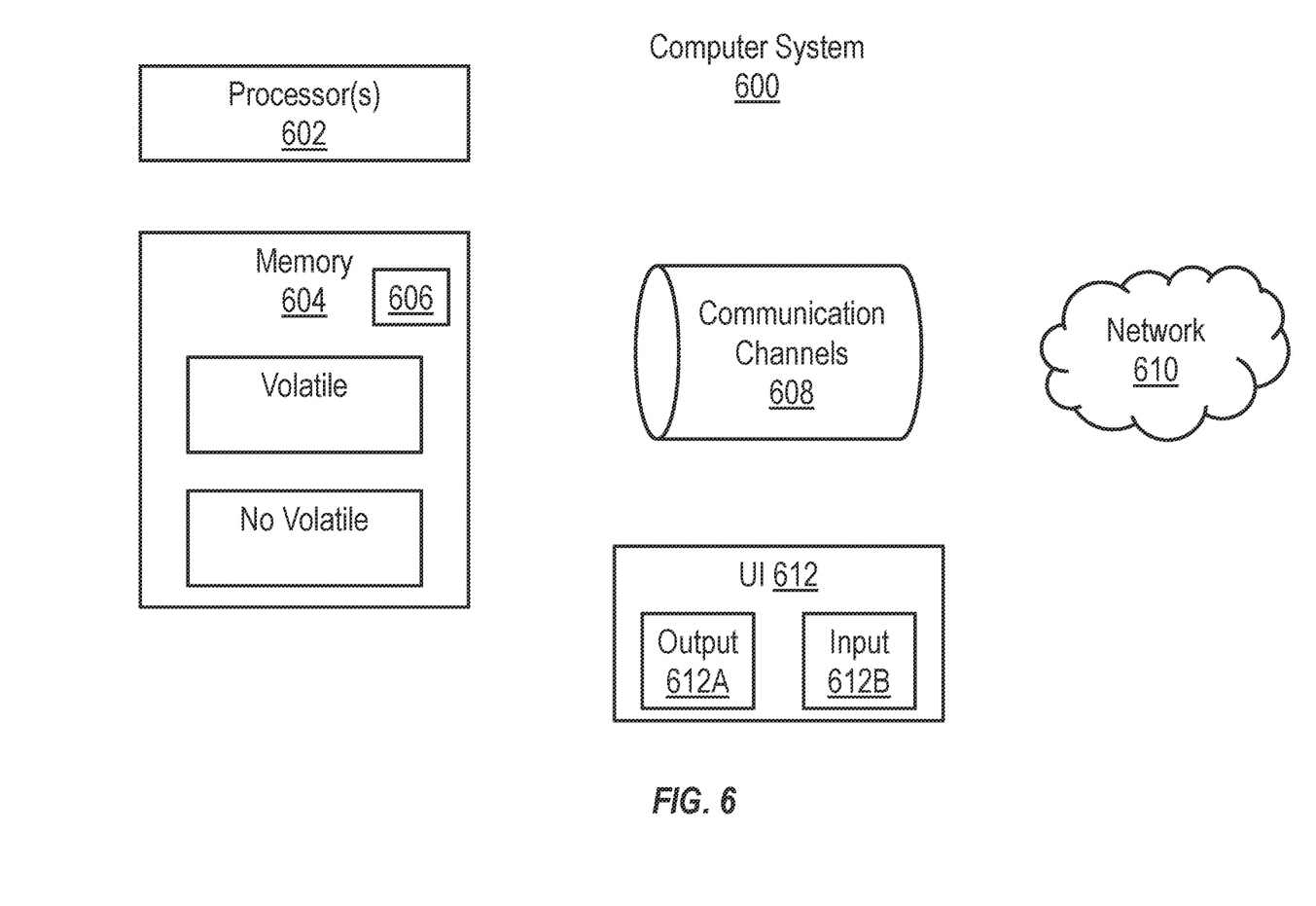
FIG. 6 illustrates an example computer system in which the principles described herein may be employed.

As illustrated in FIG. 6, in its most basic configuration, a computer system 600 typically includes at least one hardware processing unit 602 and memory 604. The processing unit 602 may include a general-purpose processor and may also include a field-programmable gate array (FPGA), an application-specific integrated circuit (ASIC), or any other specialized circuit. The memory 604 may be physical system memory, which may be volatile, non-volatile, or some combination of the two. The term "memory" may also be used herein to refer to non-volatile mass storage such as physical storage media. If the computer system is distributed, the processing, memory and/or storage capability may be distributed as well.

The computer system 600 also has thereon multiple structures often referred to as an "executable component". For instance, memory 604 of the computer system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computer system, whether such an executable component exists in the heap of a computer system, or whether the executable component exists on computer-readable storage media.

In such a case, one of ordinary skill in the art will recognize that the structure of the executable component exists on a computer-readable medium such that, when interpreted by one or more processors of a computer system (e.g., by a processor thread), the computer system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computer systems. If such acts are implemented in software, one or more processors (of the associated computer system that performs the act) direct the operation of the computer system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 604 of the computer system 600. Computer system 600 may also contain communication channels 608 that allow the computer system 600 to communicate with other computer systems over, for example, network 610.

While not all computer systems require a user interface, in some embodiments, the computer system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, and so forth. Examples of input mechanisms 612B might include, for instance, microphones, touchscreens, holograms, cameras, keyboards, mouse or other pointer input, sensors of any type, and so forth.

Embodiments described herein may comprise or utilize a special purpose or general-purpose computer system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computer system.

A "network" is defined as one or more data links that enable the transport of electronic data between computer systems and/or modules and/or other electronic devices. When information is transferred or provided over a network or another communications connection (either hard-wired, wireless, or a combination of hard-wired or wireless) to a computer system, the computer system properly views the connection as a transmission medium. Transmissions media can include a network and/or data links that can be used to carry desired program code means in the form of computer-executable instructions or data structures and which can be accessed by a general-purpose or special-purpose computer system. Combinations of the above should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile storage media at a computer system. Thus, it should be understood that storage media can be included in computer system components that also (or even primarily) utilize transmission media.

Computer-executable instructions comprise, for example, instructions and data which, when executed at a processor, cause a general-purpose computer system, special purpose computer system, or special purpose processing device to perform a certain function or group of functions. Alternatively or in addition, the computer-executable instructions may configure the computer system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computer systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computer systems which may correspond to the computer system 600 previously described. The computer systems of the remaining figures include various components or functional blocks that may implement the various embodiments disclosed herein, as will be explained. The various components or functional blocks may be implemented on a local computer system or may be implemented on a distributed computer system that includes elements resident in the cloud or that implement aspect of cloud computing. The various components or functional blocks may be implemented as software, hardware, or a combination of software and hardware. The computer systems of the remaining figures may include more or less than the components illustrated in the figures, and some of the components may be combined as circumstances warrant. Although not necessarily illustrated, the various components of the computer systems may access and/or utilize a processor and memory, such as processing unit 602 and memory 604, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented at a computer system for generating prebuilds based on state-changing commits of software development environments (SDEs), the method comprising:
   identifying a software development environment (SDE);
   generating a first prebuild of the SDE, the first prebuild representing a first point-in-time snapshot of the SDE;
   obtaining first data associated with a plurality of elements that are related to a state of the SDE;
   generating a first hash based on the first data associated with the plurality of elements that are related to the state of the SDE;
   identifying a first commit to the SDE that alters the state of the SDE;
   determining that the first commit changed the state of the SDE to be incompatible with the first point-in-time snapshot of the SDE, including:
      obtaining second data associated with the plurality of elements that are related to the state of the SDE;
      generating a second hash based on the second data associated with the plurality of elements that are related to the state of the SDE; and determining that the second hash is different from the first hash; and in response to determining that the first commit changed the state of the SDE to be incompatible with the first point-in-time snapshot of the SDE, generating a second prebuild of the SDE, the second prebuild representing a second point-in-time snapshot of the SDE that occurs after the first point-in-time snapshot of the SDE.

2. The method of claim 1, wherein the plurality of elements of the SDE include a manifest file that defines the SDE, or another file specified in the manifest file.

3. The method of claim 1, wherein the SDE is hosted in a container, and the plurality of elements of the SDE include a container image file, or a container definition file.

4. The method of claim 1, wherein the first prebuild or the second prebuild of the SDE is a storage-backed prebuild or a compute-backed prebuild.

5. The method of claim 1, wherein the method further comprises:
identifying a second commit to the SDE;
determining that the second commit did not create a new state of the SDE, including:
obtaining third data associated with the plurality of elements that are related to the state of the SDE;
generating a third hash based on the third data associated with the plurality of elements that are related to the state of the SDE; and
determining that the third hash is same as at least one of the first hash or the second hash; and
in response to determining that the second commit did not create a new state of the SDE, determining that no additional prebuild is needed.

6. The method of claim 1, wherein: a storage backs up a plurality of historical prebuilds of the SDE and a plurality of historical hashes generated based on the plurality of historical prebuilds of the SDE, and the method further includes:
comparing the second hash with each of the plurality of historical hashes to determine whether the second hash is different from each of the plurality of historical hashes; and
in response to determining that the second hash is different from each of the plurality of historical hashes, backing up the second prebuild of the SDE and the second hash in the storage.

7. The method of claim 1, wherein the method further includes:
identifying a second commit to the SDE;
determining that the second commit requires the first prebuild of the SDE rather than the second prebuild of the SDE, including:
obtaining third data associated with the plurality of elements that are related to the state of the SDE;
generating a third hash based on the third data associated with the plurality of elements that are related to the state of the SDE; and
determining that the third hash is different from the second hash and same as the first hash; and
in response to determining that the second commit requires the first prebuild of the SDE,
retrieving the first prebuild of the SDE; and
starting the SDE based on the first prebuild.

8. A computer system comprising:
one or more processors; and
one or more computer-readable storage devices having stored thereon computer-executable instructions that are structured such that, when the computer-executable instructions are executed by the one or more processors, the computer system is configured to:
identify a software development environment (SDE);
generate a first prebuild of the SDE, the first prebuild representing a first point-in-time snapshot of the SDE;
obtain first data associated with a plurality of elements that are related to a state of the SDE;
generate a first hash based on the first data associated with the plurality of elements that are related to the state of the SDE;
identify a first commit to the SDE that alters the state of the SDE;
determine that the first commit changed the state of the SDE to be incompatible with the first point-in-time snapshot of the SDE, including:
obtaining second data associated with the plurality of elements that are related to the state of the SDE;
generating a second hash based on the second data associated with the plurality of elements that are related to the state of the SDE; and
determining that the second hash is different from the first hash; and
in response to determining that the first commit changed the state of the SDE to be incompatible with the first point-in-time snapshot of the SDE, generate a second prebuild of the SDE, the second prebuild representing a second point-in-time snapshot of the SDE that occurs after the first point-in-time snapshot of the SDE.

9. The computer system of claim 8, wherein the plurality of elements of the SDE include a manifest file that defines the SDE, or another file specified in the manifest file.

10. The computer system of claim 9, wherein the plurality of elements of the SDE include a container image file.

11. The computer system of claim 9, wherein the plurality of elements of the SDE include a container definition file.

12. The computer system of claim 8, wherein the SDE is hosted in a container.

13. The computer system of claim 8, wherein the first prebuild or the second prebuild of the SDE is a storage-backed prebuild or a compute-backed prebuild.

14. The computer system of claim 8, wherein the computer system is further configured to:
identify a second commit to the SDE;
determine that the second commit did not create a new state of the SDE, including:
obtaining third data associated with the plurality of elements that are related to the state of the SDE;
generating a third hash based on the third data associated with the plurality of elements that are related to the state of the SDE; and
determining that the third hash is same as at least one of the first hash or the second hash; and
in response to determining that the second commit did not create a new state of the SDE, determine that no additional prebuild is needed.

15. The computer system of claim 8, wherein the computer system is further configured to, in response to determining that the first commit to the SDE is incompatible with the SDE,
retrieve the first prebuild of the SDE from a storage; and
start the SDE based on the first prebuild.

16. The computer system of claim 1, wherein: a storage backs up a plurality of historical prebuilds of the SDE and a plurality of historical hashes generated based on the plurality of historical prebuilds of the SDE, and the computer system is configured to: compare the second hash with each of the plurality of historical hashes to determine whether the second hash is different from each of the plurality of historical hashes; and in response to determining that the second hash is different from each of the plurality of historical hashes, back up the second prebuild of the SDE and the second hash in the storage.

17. The computer system of claim 16, wherein the storage backs up a predetermined number of prebuilds and corresponding historical hashes.

18. The computer system of claim 16, wherein the storage backs up each prebuild and its corresponding historical hash for a predetermined time.

19. The computer system of claim 8, wherein the computer system is further configured to:
    identify a second commit to the SDE;
    determine that the second commit requires the first prebuild of the SDE rather than the second prebuild of the SDE, including:
        obtaining third data associated with the plurality of elements that are related to the state of the SDE;
        generating a third hash based on the third data associated with the plurality of elements that are related to the state of the SDE; and
        determining that the third hash is different from the second hash and same as the first hash; and
    in response to determining that the second commit requires the first prebuild of the SDE,
        retrieve the first prebuild of the SDE; and
        start the SDE based on the first prebuild.

20. A hardware storage device having stored thereon computer-executable instructions that are structured such that, when the computer-executable instructions are executed by one or more processors of a computer system, the computer-executable instructions configure the computer system to at least:
    identify a software development environment (SDE);
    generate a first prebuild of the SDE, the first prebuild representing a first point-in-time snapshot of the SDE;
    obtain first data associated with a plurality of elements that are related to a state of the SDE;
    generate a first hash based on the first data associated with the plurality of elements that are related to the state of the SDE;
    identify a first commit to the SDE that alters the state of the SDE;
    determine that the first commit changed the state of the SDE to be incompatible with the first point-in-time snapshot of the SDE, including:
        obtaining second data associated with the plurality of elements that are related to the state of the SDE;
        generating a second hash based on the second data associated with the plurality of elements that are related to the state of the SDE; and
        determining that the second hash is different from the first hash; and
    in response to determining that the first commit changed the state of the SDE to be incompatible with the first point-in-time snapshot of the SDE, generate a second prebuild of the SDE, the second prebuild representing a second point-in-time snapshot of the SDE that occurs after the first point-in-time snapshot of the SDE.

* * * * *